(12) United States Patent
Walters

(10) Patent No.: US 11,846,340 B2
(45) Date of Patent: Dec. 19, 2023

(54) VIBRATION DAMPER AND/OR ABSORBER

(71) Applicant: Christopher Paulet Melmoth Walters, Littlehampton (GB)

(72) Inventor: Christopher Paulet Melmoth Walters, Littlehampton (GB)

( * ) Notice: Subject to any disclaimer, the term of this patent is extended or adjusted under 35 U.S.C. 154(b) by 55 days.

(21) Appl. No.: 17/598,663

(22) PCT Filed: Mar. 26, 2020

(86) PCT No.: PCT/GB2020/050812
§ 371 (c)(1),
(2) Date: Sep. 27, 2021

(87) PCT Pub. No.: WO2020/201722
PCT Pub. Date: Oct. 8, 2020

(65) Prior Publication Data
US 2022/0170527 A1     Jun. 2, 2022

(30) Foreign Application Priority Data

Mar. 29, 2019  (GB) .................................... 1904372

(51) Int. Cl.
*F16F 7/08* (2006.01)
*F16F 7/09* (2006.01)
*B64C 27/00* (2006.01)

(52) U.S. Cl.
CPC .............. *F16F 7/08* (2013.01); *B64C 27/001* (2013.01); *F16F 7/095* (2013.01); *B64C 2027/002* (2013.01)

(58) Field of Classification Search
CPC ..... F16F 7/08; F16F 7/09; F16F 7/095; B64C 27/001; B64C 2027/002
(Continued)

(56) References Cited

U.S. PATENT DOCUMENTS

| 8,496 A | * | 11/1851 | Webster | ................. | B61G 11/14 |
| | | | | | 267/196 |
| 1,153,531 A | * | 9/1915 | Adams | ...................... | B61F 5/12 |
| | | | | | 267/214 |

(Continued)

FOREIGN PATENT DOCUMENTS

| CN | 108 825 704 A | 11/2018 |
| DE | 102008045014 A1 | 4/2010 |

(Continued)

OTHER PUBLICATIONS

Search Report and Written Opinion for Application No. EP 23 13 3871, dated Jun. 12, 2023, 6 pages.

*Primary Examiner* — Thomas J Williams
(74) *Attorney, Agent, or Firm* — Boyle Fredrickson, S.C.

(57) ABSTRACT

A linear vibration damper and/or absorber includes a centre shaft (12) having bearing regions (18) and friction contact regions (20), and a housing (2) including finger assemblies (22) which are mounted with a small radial clearance for accurate location on the bearing regions (18) for axial displacement with respect to the centre shaft (12) along a central axis (X), the finger assemblies (22) each including resilient fingers (38) which extend axially from respective body sections (26) and have contact faces (40) which resiliently engage, i.e. are pressed by the resilience of the fingers (40) into contact with, friction surfaces (20) of the contact regions of the centre shaft (12), whereby relative linear displacement between the centre shaft (12) and the housing (2) is opposed by frictional contact between the friction surfaces (20) and the contact faces (40).

20 Claims, 4 Drawing Sheets

(58) Field of Classification Search
USPC .................................... 267/196, 201, 214
See application file for complete search history.

(56) References Cited

U.S. PATENT DOCUMENTS

| | | | | |
|---|---|---|---|---|
| 1,260,018 A * | 3/1918 | Oliver | ................. | B61F 5/12 |
| | | | | 188/129 |
| 1,260,019 A * | 3/1918 | Oliver | ................. | B61F 5/12 |
| | | | | 267/209 |
| 1,495,932 A * | 5/1924 | Stitt | ................. | B60G 13/04 |
| | | | | 267/214 |
| 1,745,033 A * | 1/1930 | Smith | ................. | B60G 13/04 |
| | | | | 279/23.1 |
| 2,615,535 A * | 10/1952 | Snyder | ................. | F16F 7/09 |
| | | | | 267/209 |
| 3,715,176 A | 2/1973 | Kerklo | | |
| 3,796,288 A * | 3/1974 | Hollnagel | ................. | F16F 7/09 |
| | | | | 280/455.1 |
| 3,866,724 A * | 2/1975 | Hollnagel | ................. | F16F 7/09 |
| | | | | 267/209 |
| 7,828,113 B1 | 11/2010 | Dao | | |
| 2008/0142633 A1 | 6/2008 | McGuire et al. | | |
| 2012/0298794 A1 * | 11/2012 | Krysinski | ............. | B64C 27/001 |
| | | | | 244/17.27 |
| 2018/0044027 A1 * | 2/2018 | Chasen | ................. | F16F 7/08 |

FOREIGN PATENT DOCUMENTS

| | | | | |
|---|---|---|---|---|
| EP | 1164312 A2 * | 12/2001 | ........... | F16H 7/0831 |
| GB | 652479 A | 4/1951 | | |
| JP | 2003214471 A | 7/2003 | | |
| JP | 2015094463 A | 5/2015 | | |
| KR | 100908006 B1 * | 7/2009 | ............. | F16F 7/095 |
| RU | 2653930 C1 | 5/2018 | | |
| SU | 1 557 220 A1 | 4/1990 | | |
| SU | 1557220 A1 | 4/1990 | | |
| SU | 1 689 691 A1 | 11/1991 | | |
| SU | 1689691 A1 | 11/1991 | | |
| WO | 2008006081 A2 | 5/2008 | | |
| WO | WO-2017104951 A1 * | 6/2017 | ............. | F16F 7/095 |

* cited by examiner

VIBRATION DAMPER AND/OR ABSORBER

This invention relates to a vibration damper and/or absorber, and is particularly, although not exclusively, concerned with a linear vibration damper and/or absorber for minimising the transmission of vibration from a vibrating mechanism to a support structure of the mechanism.

It is known to employ hydraulic dampers and/or absorbers to minimise the transmission of vibration from one component to another. The damping/absorbing response of hydraulic dampers/absorbers is non-linear, and is significantly affected by temperature, loading, and the frequency and amplitude of the vibration to be damped. The design of such dampers/absorbers to cope with the range of conditions, and multiple vibratory inputs (frequency and amplitude) experienced in practice is thus complex. Furthermore, in safety-critical applications, the loss of hydraulic fluid can have catastrophic results.

According to the present invention there is provided a vibration damper and/or absorber including a first member having a bearing region and a friction contact region, and a second member including a body which is mounted on the bearing region for axial displacement with respect to the first member along an axis, the second member including a resilient member which projects from the body and which has a contact face which resiliently engages the friction contact region of the first member, whereby relative axial displacement between the first and second members is opposed by frictional contact between the contact face and the friction contact region.

The resilient member may project from the body in an axial direction with respect to the axis. The contact face may be provided at or near a free end of the resilient member.

The resilient member may be one of a pair of oppositely disposed resilient members extending axially from the body in the same direction and contacting the friction contact region on opposite sides of the axis. The forces applied by the oppositely disposed resilient members thus balance each other so as to eliminate any net transverse force applied by the members to the first member.

The oppositely disposed pair of resilient members may be one of two oppositely disposed pairs of resilient members which contact the contact region, the two pairs being offset from one another by 90° about the axis. In such an embodiment, the frictional contact between the resilient members and the contact region can be increased. There may be more than two oppositely disposed pairs of members, distributed regularly around the axis. There may be an odd or even number of second members positioned around the axis.

The or each resilient member may constitute a first resilient member extending axially from the body in a first direction and in which the contact region constitutes a first contact region situated axially on one side of the bearing region, the body being provided with at least one second resilient member aligned with the or each respective first resilient member and extending axially from the body in a second direction opposite to the first direction and contacting a second contact region of the first member, situated axially on the other side of the bearing region.

The or each member may contact the respective contact region at a respective friction surface of the contact region. If the body is provided with two pairs of resilient members, on one or both sides of the bearing region, the contact region for each two pairs of members may have a square cross section (when viewed axially), the friction surfaces constituting the sides of the square. The cross-section may be non-square but still rectangular. The cross-section may be another polygonal shape.

The or each friction surface may extend parallel to the axis, which may be a generally central axis. The pressure applied to the friction surface by the resilient member acting on the respective friction surface will thus remain constant or substantially constant over the travel of the member. Consequently, the frictional resistance to travel will also remain constant, or substantially constant.

Alternatively, at least part of the friction surface or of at least one of the friction surfaces may be inclined to the axis. The pressure applied to the friction surface and hence the resistance to travel (linear rate) and the frictional resistance to travel, and consequently the damping/absorbing effect, will thus vary as the resilient member moves relative to the friction surface. The gradient of inclination may be constant or may increase as the friction surface extends towards the body.

It may be desirable for the friction surfaces and the contacting surfaces of the resilient members to be hardened and highly polished and hard coated, in order to achieve a long service life.

The bearing region of the first member may be one of a plurality of bearing regions and the friction contact region may be one of a plurality of friction contact regions, in which case the body may be one of a plurality of similar bodies supported on the first member at the respective bearing regions, the resilient members of the bodies contacting respective ones of the friction contact regions. Such an embodiment enables the damping/absorbing effect to be increased without increasing the radial width of the damper and/or absorber, with respect to the axis.

The second member may include a housing which accommodates the or each body, the or each body being secured to the housing.

The housing may contain a lubricant, the housing being sealed with respect to the first member.

The first member and the second member may each be provided with a respective coupling element for connecting the damper and/or absorber between two components.

The present invention also provides an installation including a support structure and a mechanism mounted on the support structure, a damper and/or absorber as defined above being connected between the support structure and the mechanism.

For a better understanding of the present invention, and to show more clearly how it may be carried into effect, reference will now be made, by way of example, to the accompanying drawings, in which:

FIGS. 1 to 3 show a linear damper and/or absorber which has a variety of uses but may, for example, be employed to minimise the transmission of vibration between a mechanism which generates, or is subjected to, vibration and a support structure (not shown). It is undesirable for these vibrations to be transmitted to the support structure as they can create potentially damaging stresses.

Figure 1:
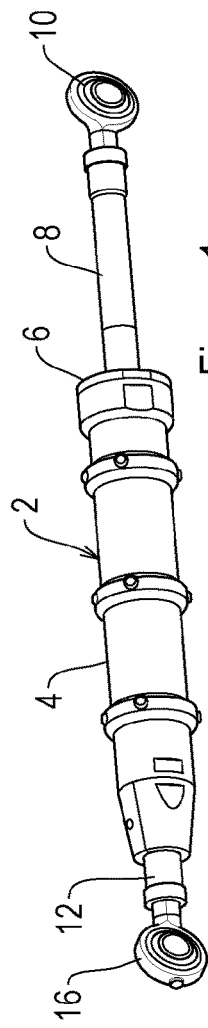
FIG. 1 is a side view of a linear damper and/or absorber.
Figure 2:
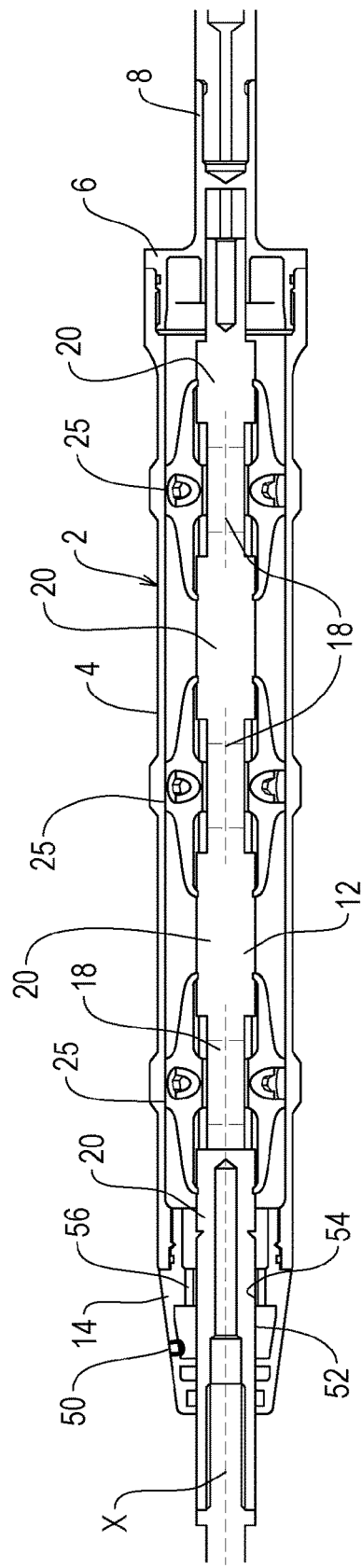
FIG. 2 is a longitudinal sectional view of the damper and/or absorber of FIG. 1.
Figure 3:
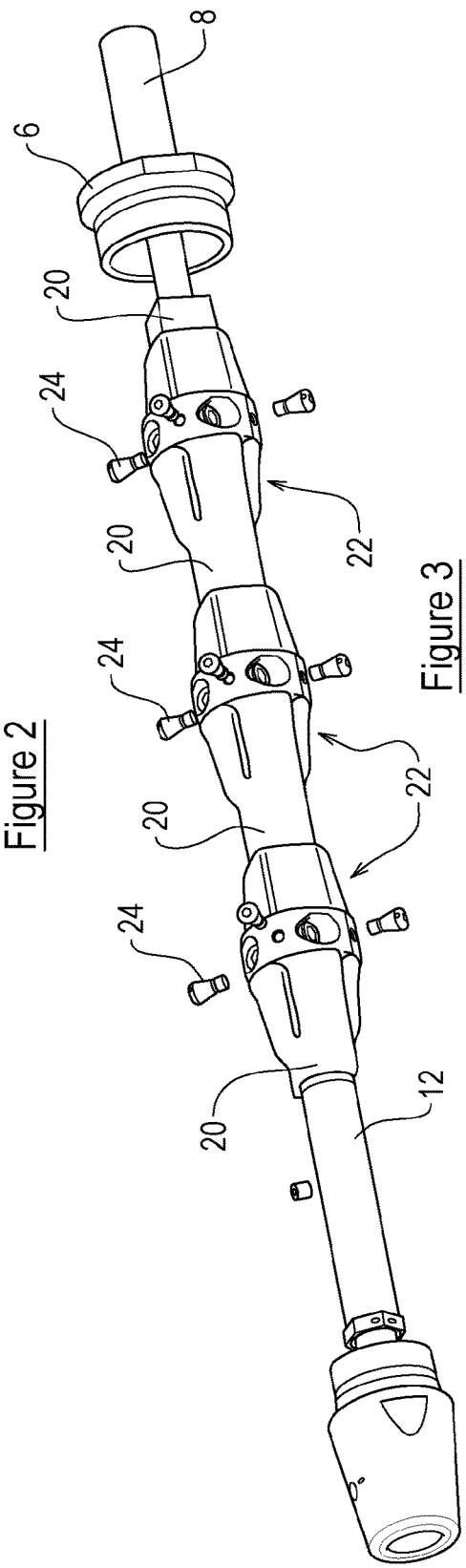
FIG. 3 is a view of the damper and/or absorber of FIG. 2 with a housing omitted.

The damper and/or absorber shown in FIGS. 1 to 3 includes a housing 2 including a tubular casing 4 having at one end an end cap 6 from which extends a rod 8 terminating at an adjustable ball joint coupling 10.

A centre shaft 12 having a central axis X is situated within the housing 2 and is supported at one end in the end cap 6 and at the other end in a nose piece 14 which is secured to the casing 4. The centre shaft 12 projects through the nose piece 14 and is provided with a second adjustable ball joint coupling 16. Seals (not shown) are provided between the nose piece 14 and the centre shaft 12, and between the casing 4 and the end cap 6, so that the interior of the housing 2 constitutes a sealed enclosure which can retain lubricating oil.

Figure 8:
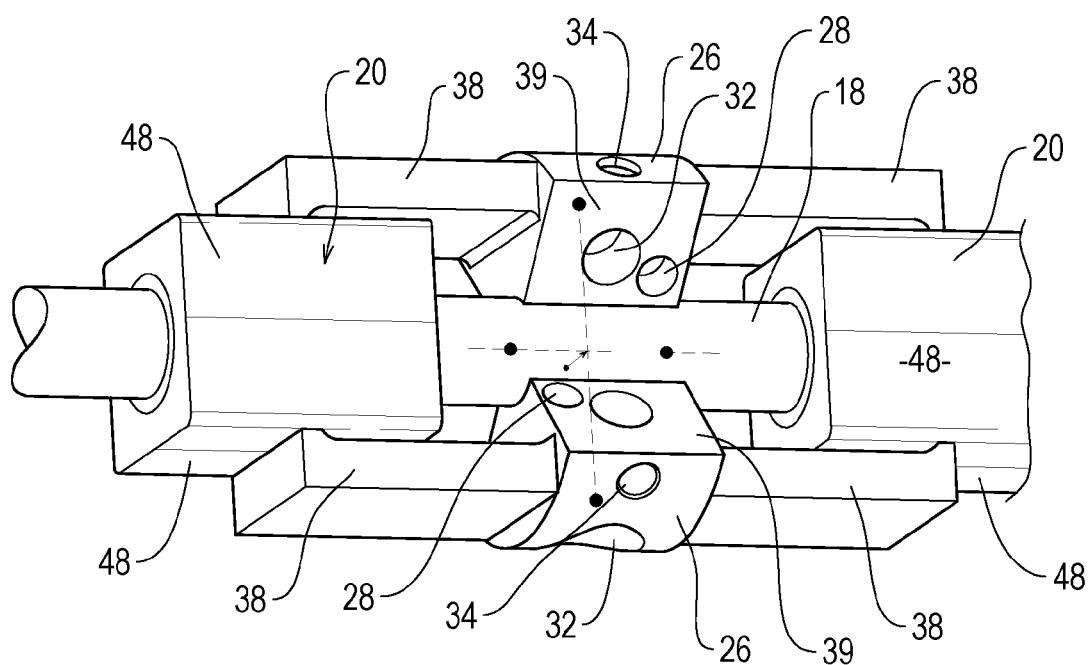
FIG. 8 is a schematic sectional view of part of the damper and/or absorber.

The centre shaft 12 includes three cylindrical bearing regions 18 centred on the central axis X and situated in each case between friction contact regions 20 provided with friction surfaces 48 (see FIG. 8). The friction surfaces 48 are substantially flat.

Finger assemblies 22 are secured by tapered screws 24 to the inside surface of the casing 4. In order to enhance rigidity of the casing 4, reinforcing ribs 25 are provided on the casing 4 in the region of the tapered screws 24.

Figure 4:
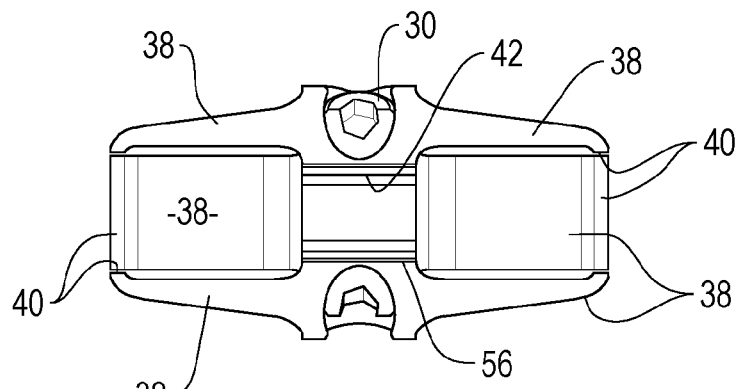
FIG. 4 is a sectional view of a sub-assembly of the damper and/or absorber.
Figure 5:
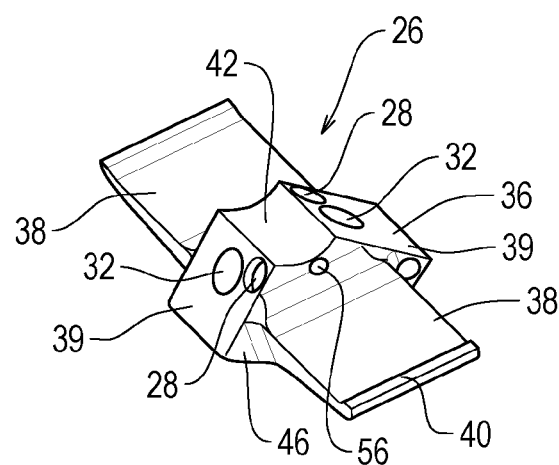
FIGS. 5 and 6 are alternative views of a component of the sub-assembly of FIG. 4.
Figure 6:
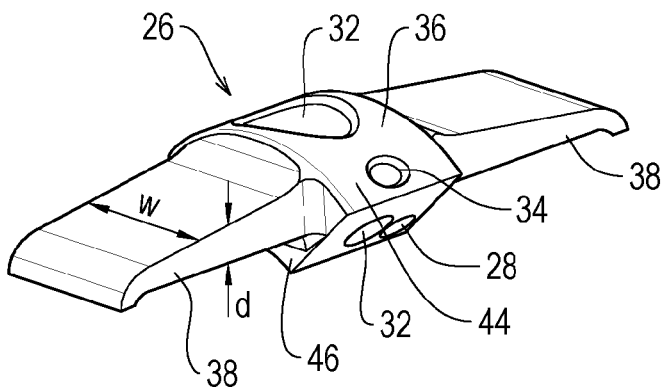
Figure 7:
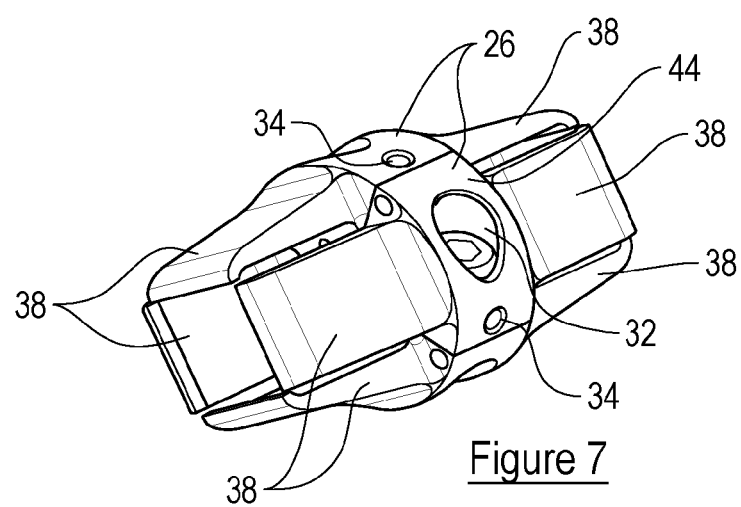
FIG. 7 shows the sub-assembly.

One of the finger assemblies 22 is shown in more detail in FIGS. 4 and 7. Each finger assembly 22 includes four quadrant elements 26, as shown in FIGS. 5 and 6. The quadrant elements 26 are assembled together to form the finger assemblies 22, the elements 26 being located with respect to one another by dowels placed in holes 28, and secured together by bolts 30 fitted into screw holes 32. The quadrant elements 26 are also provided with tapped bores 34 for receiving the tapered screws 24.

As shown in FIGS. 5 and 6, each quadrant element 26 includes a body section 36 from which projects, in opposite directions, resilient members or fingers 38. Each finger 38 tapers outwardly from the body section 36 and terminates at a contact face 40 which is directed inwardly with respect to the central axis X. In other words, the contact face 40 is provided at or near a free end of the resilient finger 38. Each finger 38 has a rectangular cross-section with a constant width w measured tangentially with respect to the central axis X, and a depth d, measured radially with respect to the central axis X, which decreases in the direction away from the body section 36. The contact face 40 is of a thin, rectangular shape with the larger dimension extending tangentially of the central axis 22 and the shorter dimension extending axially.

The body section 36 of each quadrant element 26 includes a pair of abutment faces 39 which are at 90° to each other. The abutment faces 39 are interconnected at their radially inner ends by an inner arcuate surface 42, which is complementary to the profile of the bearing regions 18. At their radially outer ends, the abutment faces are interconnected by an outer arcuate surface 44 which is complementary to the inner surface of the casing 4. Each quadrant element 26 has axial end faces 46 from which the fingers 38 project.

The quadrant elements 26 are assembled together around the respective bearing regions 18 of the centre shaft 12 to form the respective finger assemblies 22. This is done by placing dowel pins in the holes 28, and then fitting the quadrant elements 26 together, located by the dowel pins, by bringing the abutment faces 39 of adjacent quadrant elements 26 into contact with one another. The quadrant elements 26 are then secured together by means of the bolts 30 inserted into the tapped bores 32. The bolts 30 extend at right-angles to the central axis X, i.e. in a tangential plane, and are situated generally centrally of the respective abutment faces 39. The resulting assembly is shown in FIGS. 4 and 7, with the centre shaft 12 omitted, and it will be appreciated that the inner arcuate surfaces 42 together form a cylindrical bore in which the respective bearing region 18 of the centre shaft 12 is situated. The fingers 38 projecting from the axial faces 46 of the assembled body sections 36 are arranged to form a square opening defined by the contact faces 40 of the fingers 38.

As shown in FIGS. 2, 3 and 8, the fingers 38 project beyond the bearing region 18 to extend over the friction surfaces 48. The fingers 38 are configured so that they are stressed when the finger assemblies 22 are fitted to the centre shaft 12. As a result, there is a residual resilient radial load exerted by the fingers 38 at the contact faces 40, on the friction surfaces 48. The total force resisting extension or retraction of the damper and/or absorber as a whole may, for example, be in excess of 5000 N.

If necessary, after assembling the finger assemblies 22 on the centre shaft 12, the outer surfaces of the finger assemblies, formed from the outer arcuate surfaces 44, may be ground to an accurate diameter to fit properly in the casing 4.

The friction contact regions 20 of the centre shaft 12 have a square cross-section, with the result that the friction surfaces 48 are arranged as a square. With reference to FIG. 8, the fingers 38 projecting to the left of the body section 26 can be considered to be first fingers, and the contact region 20 situated to the left of the bearing region 18 can be considered to be a first contact region, while the fingers 38 projecting to the right of the body section 26 can be considered to be second fingers, and the contact region 20 situated to the right of the bearing region 18 can be considered to be a second contact region. In FIG. 8, only one pair of the first fingers 38 is shown, the fingers 38 of this pair being disposed opposite each other and engaging the friction surfaces 48 on opposite sides of the square profile of the first contact region 20. Two further quadrants 26 (not shown in FIG. 8) are present, providing a second pair of first fingers 38 which are offset by 90° to the first fingers 38 shown in FIG. 8. The finger assemblies 22 are generally symmetrical about a transverse plane passing through the body sections 36, and so the second fingers, to the right of the body sections 26, are aligned with the respective first fingers 38, and extend from the respective body sections 36 in the opposite direction from the first fingers 38. The second fingers 38 contact the friction surfaces 48 of the second friction contact region 20 in the same manner as described above for the first fingers 38. A consequence of this arrangement is that the load applied by each finger 38 is opposed by the finger on the opposite side of the respective friction contact region 20 so that each friction contact region is gripped between two pairs of fingers 38, oriented at 90° to each other. As a result, there is no net radial force applied by the fingers 38 to the centre shaft 12. Also, because each finger assembly 26 has first and second oppositely extending fingers 38 projecting from each body section 36, there is a total of eight fingers 38 acting through their contact faces 40 on the first and second friction contact regions 20 situated to each side of the bearing region 18 on which the finger assembly 26 can slide.

Furthermore, because the centre shaft 12 has three bearing regions 18, each carrying a finger assembly 26, the total number of finger contact faces 40 engaging respective friction surfaces 48 is twenty-four. Of course, as will be appreciated, more or fewer than three finger assemblies 26 can be provided on a common centre shaft 12 in order to provide the required frictional force resisting axial displacement of the centre shaft with respect to the housing 2.

Once all of the finger assemblies 22 have been fitted to the centre shaft 12 at the bearing regions 18, the assembly including the centre shaft 12 and the finger assemblies 22 is inserted into the casing 4. The end cap 6 and the nose piece 14 are then fitted to the casing 4 and the housing 2 is then filled, at least partly, with lubricating oil through a filler plug 50 so that in use the contact faces 40 of the fingers 38 and the friction surfaces 48 are continuously immersed in the lubricant. It is not necessary for the lubricant to be supplied under pressure between the friction surfaces 48 and the contact faces 40.

The centre shaft 12 has a plain bearing diameter section 52 at one end that engages in a hardened bearing area 54 provided in the nose piece 14. Axial drain holes 56 in the nose piece 14 and in the quadrant elements 26 allow flow of lubricant to all internal regions of the damper and/or absorber.

To enable accurate location, there is a small radial clearance between the surfaces of the bearing regions 18 and the cylindrical bores formed by the inner arcuate surfaces 42. This clearance can accommodate any slight radial misalignment between the casing 4 and the centre shaft 12, and also provides a path for lubricant to provide hydrodynamic lubrication between the bearing regions 18 and the finger assemblies 22.

For use, the damper and/or absorber is fitted between two machinery components, for example a mechanism subject to vibration and a supporting structure, by means of the adjustable ball joints 10, 16. Any displacement between the two components, and in particular displacement resulting from vibration of one of the components, is damped/absorbed by the damper and/or absorber. This is achieved by virtue of the frictional contact between the centre shaft 12 at the friction surfaces 48 and the contact faces 40 of the fingers 38 on the finger assemblies 22. The full surfaces of the contact faces 40 make contact with the friction surfaces 48. Once the amplitudes and frequencies of the expected vibrations are known, the profile of the fingers 38 can be established so that the damping/absorbing characteristics of the damper and/or absorber as a whole are sufficient to isolate the two machinery components from each other, so as to minimise the transmission of vibration from one to the other.

It will be appreciated that, at relatively low axial forces between the ends 10, 16 of the damper and/or absorber, the Coulomb friction between the contact faces 40 and the friction surfaces 48 will prevent any relative movement between the centre shaft 22 and the housing 2, and the damper and/or absorber will then behave as a rigid strut. However, when the axial force exceeds a threshold, determined by the contact areas and the radial force exerted by the resilient fingers 38, there will be axial sliding movement between the contact faces 40 and the friction surfaces 48. This movement is opposed by the Coulomb friction between the surfaces. The opposing frictional force will be substantially constant regardless of the speed of relative axial movement. This will provide a nearly constant damping/absorbingH force axially at every point within an envelope of axial positions. This envelope, defining the maximum travel of the centre shaft 12 within the housing 2, may be established by stops (not shown). The components of the damper and/or absorber, and in particular the profile of the fingers 38, may be designed to ameliorate the vibration, with the ability to do so with multiple frequencies present, with suitable tunable damper and/or absorber characteristics (amplitude and frequency) of a vibratory input to be damped.

In a particular embodiment, the friction surfaces 48 of the centre shaft 12 and the contact faces 40 of the fingers 38 are hardened, polished and hard coated, for example using techniques known for the treatment of cam surfaces in internal combustion engines.

In the above description, the finger assemblies 22 are described as being assembled from individual quadrant elements 26. It will be appreciated that this is one of a number of construction options for the finger assemblies 22, and that other arrangements for fitting the finger assemblies 22 to the centre shaft 12 may be employed. Also, although the bearing regions 18 and the bores formed by the inner arcuate surfaces 42 are shown as cylindrical, this is not essential. The finger assemblies move only in the axial direction on the centre shaft 12, but do not rotate. Consequently, the bearing surfaces 18 and 42 could be non-circular, and in particular the bearing regions 18 of the centre shaft 12 could be continuations of the friction surfaces 48. The quadrant elements 26 would then have flat bearing surfaces in place of the inner arcuate surfaces 42. Regardless of the profile of the bearing regions 18 and the arcuate surfaces 42, they may be hardened, polished and hard coated in the same manner as the friction surfaces 48 and the contact faces 40.

In some embodiments where the bearing regions have the same profile and dimensions as the friction contact regions 20, the finger assemblies 22 may be assembled separately from the centre shaft 12 and subsequently pushed onto the centre shaft 12 from one end, for example the end supported in the end cap 6. That end may have a tapered lead-in section to spread the fingers 38 onto the friction surfaces 48/bearing regions 18.

Figure 9:
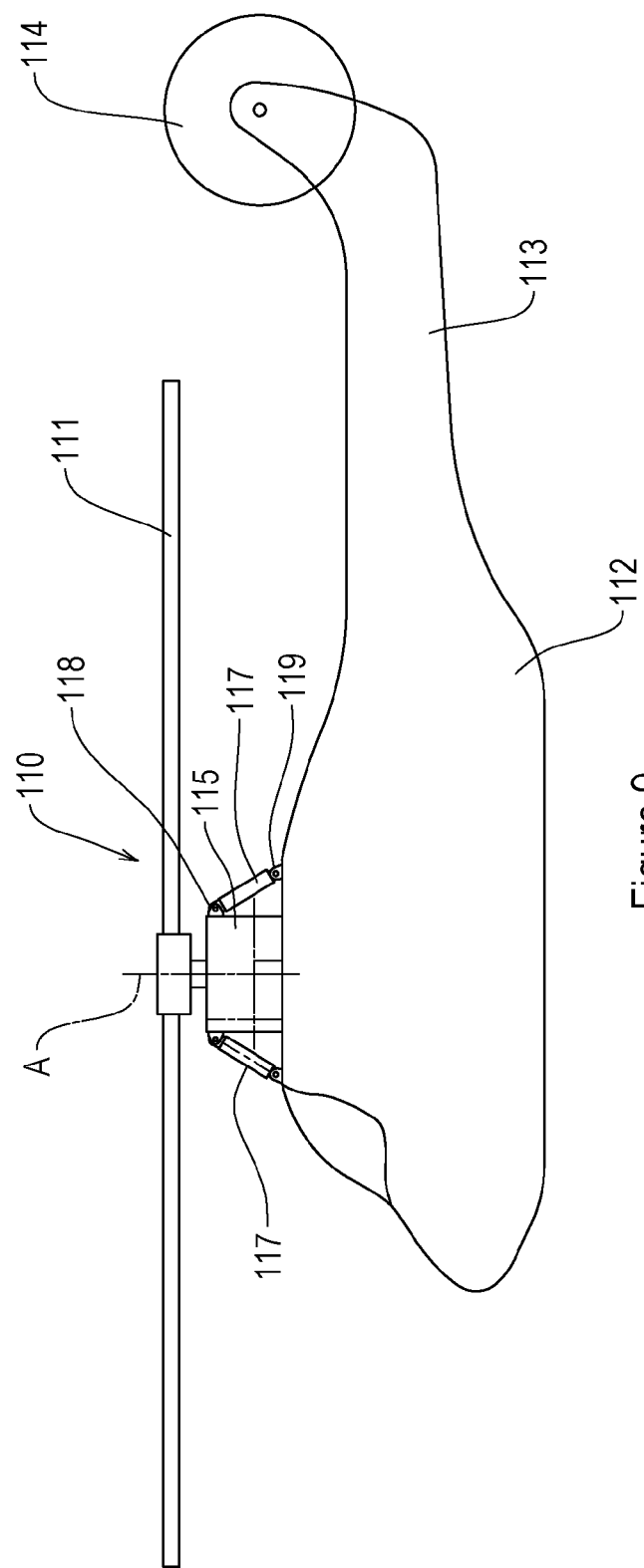
FIG. 9 is a view illustrating a helicopter structure having strut assemblies, each of which includes a damper and/or absorber according to the present invention.

Referring to FIG. 9, a helicopter structure is generally indicated at 100 including a rotating system including a main sustaining rotor 111, a helicopter fuselage 112 having rearwardly extending tail part 113 carrying an anti-torque rotor 114. The fuselage 112 carries an engine and gearbox 115 which transmits drive to the main sustaining rotor 111, to drive the rotor 111 about an axis A. The gearbox 115 is attached to the fuselage 112 by means of a plurality of resilient strut assemblies 117, each of which includes a damper and/or absorber according to the present invention, e.g. one as shown or in a form similar to that as shown in FIGS. 1 to 8. In the present embodiment there are four resilient strut assemblies 117, one positioned generally at each corner of the gearbox 115; two at the front and two at the rear.

The fuselage 112 and gearbox 115 include parts of the helicopter structure which are capable of relative motion at a frequency corresponding substantially with a vibration exciting frequency and the resilient strut assemblies are configured to dampen the vibrations which will necessarily occur as the rotating system rotates, so as to dampen the forces seen by the fuselage.

Whilst the present invention has been described above with reference to its use in a helicopter, is should be appreciated that the dampers and/or absorbers of the present invention could be applied to other vibrating systems, such as, for examples (by no means limiting):—
  a) ships or vessels, where the first vibrating body is an engine or engines and the second body is a hull of the ship or vessel;

b) aircraft, where the first vibrating body is a propeller(s) and gearbox(es) and engine(s) and the second body is an airframe of the aircraft;

c) power generation systems, where the first vibrating body is an internal combustion engine or rotor such as a turbine or generator, and the second body is the source mounting structure; and d) other systems where an internal combustion engine or other reciprocating or rotating machine induces vibration in a first body and it is desired to reduce the transmission of those vibrations to a connected second body.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A vibration damper and/or absorber including a first member having a bearing region and a friction contact region, and a second member including a body which is mounted on the bearing region for axial displacement with respect to the first member along an axis, the second member including a resilient member which extends axially from the body and which has a friction surface which resiliently engages the contact region of the first member, whereby relative linear displacement between the first and second members is opposed by frictional contact between the friction surface and the contact region, wherein the or each resilient member comprises a first resilient finger extending axially from the body in a first direction and in which the contact region constitutes a first contact region situated axially on one side of the bearing region, the body being provided with at least one second resilient finger aligned with the or each respective first resilient finger and extending axially from the body in a second direction opposite to the first direction and contacting a second contact region of the first member, situated axially on the other side of the bearing region from the first contact surface.

2. A vibration damper and/or absorber as claimed in claim 1, in which the resilient member projects from the body in an axial direction with respect to the central axis.

3. A vibration damper and/or absorber as claimed in claim 2, in which the resilient member is one of a pair of oppositely disposed resilient members extending axially from the body in the same direction and contacting the contact region on opposite sides of the axis.

4. A vibration damper and/or absorber as claimed in claim 3, in which the oppositely disposed pair of resilient members is one of two oppositely disposed pairs of resilient fingers which contact the contact region, the two pairs being offset from one another by 90° about the axis.

5. An apparatus for reducing vibration of a structure of a helicopter which includes a fuselage supporting or supported by a rotating system, and in which parts of the structure are capable of relative motion at an exciting frequency, the apparatus including a plurality of dampers and/or absorbers each in accordance with claim 1 adapted to be connected between the relatively movable parts of the structure.

6. A vibration damper and/or absorber as claimed in claim 4, in which the or each resilient finger contacts the respective contact region at a respective friction surface of the contact region.

7. A vibration damper and/or absorber as claimed in claim 6, in which the contact region has a square cross section, the friction surfaces constituting the sides of the square.

8. A vibration damper and/or absorber as claimed in claim 6, in which the or each friction surface extends parallel to the axis.

9. A vibration damper and/or absorber as claimed in claim 6, in which at least part of the friction surface or of at least one of the friction surfaces is inclined to the axis.

10. A vibration damper and/or absorber as claimed in claim 1, in which the bearing region of the first member is one of a plurality of bearing regions and the friction contact region is one of a plurality of friction contact regions, and in which the body is one of a plurality of similar bodies supported on the first member at the respective bearing regions, the resilient fingers of the bodies contacting respective ones of the friction contact regions.

11. A vibration damper and/or absorber as claimed in claim 1, in which the second member includes a housing which accommodates the or each body, the or each body being secured to the housing.

12. A vibration damper and/or absorber as claimed in claim 11, in which the housing contains a lubricant, the housing being sealed with respect to the first member.

13. A vibration damper and/or absorber as claimed in claim 11, in which the first member and the second member are each provided with a respective coupling element for connecting the damper and/or absorber between two components.

14. A vibration damper and/or absorber as claimed in claim 1 wherein the or each resilient finger is configured such that there is a residual resilient load exerted by each member at the contact region.

15. A damper and/or absorber according to claim 1 wherein the damper and/or absorber is a linear vibration damper and/or absorber.

16. An installation including a support structure and a mechanism mounted on the support structure, one or more dampers and/or absorbers in accordance with claim 1 being connected between the support structure and the mechanism.

17. An aircraft including one or more dampers and/or absorbers each according to claim 1.

18. A helicopter including one or more dampers and/or absorbers, each damper and/or absorber in accordance with claim 1.

19. An apparatus according to claim 18 wherein the rotating system is the main sustaining rotor.

20. An apparatus according to claim 18 wherein one part of the structure which is capable of motion relative to another part of the structure includes one of or an assembly of more than one of an engine, a transmission, and a supporting structure of the rotating system.

* * * * *